(12) United States Patent
Howard, Jr. et al.

(10) Patent No.: US 11,541,787 B2
(45) Date of Patent: Jan. 3, 2023

(54) SEAT ENERGY ABSORBER ASSEMBLY

(71) Applicant: Honda Motor Co., Ltd., Tokyo (JP)

(72) Inventors: John F. Howard, Jr., Marysville, OH (US); Eric D. Daume, Plain City, OH (US); John J. Hwang, Troy, MI (US); Carlington G. Demetrius, Dublin, OH (US); Akira Miyazaki, Birmingham, MI (US); Yoshiaki Ikeda, Tochigi (JP); Benjamin M. Oros, Dublin, OH (US); Junichi Suzuki, Royal Oak, MI (US); Fernando M. Rosero, Rochester Hills, MI (US); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/216,839

(22) Filed: Mar. 30, 2021

(65) Prior Publication Data
US 2022/0314847 A1 Oct. 6, 2022

(51) Int. Cl.
*B60N 2/427* (2006.01)
*B60N 2/42* (2006.01)

(52) U.S. Cl.
CPC ..... *B60N 2/42736* (2013.01); *B60N 2/42709* (2013.01); *B60N 2/4228* (2013.01); *B60N 2/4242* (2013.01)

(58) Field of Classification Search
CPC ........................ B60N 2/42736; B60N 2/42709
USPC ...... 297/216.1, 216.11, 216.14, 463.1, 463.2
See application file for complete search history.

(56) References Cited

U.S. PATENT DOCUMENTS

| | | | |
|---|---|---|---|
| 5,468,044 A | 11/1995 | Coman | |
| 5,558,398 A | 9/1996 | Santos | |
| 5,826,937 A | 10/1998 | Massara | |
| 6,135,561 A | 10/2000 | Krüger et al. | |
| 7,270,371 B2 * | 9/2007 | Adragna | B60N 2/3093 296/65.09 |
| 7,377,590 B2 | 5/2008 | Mattes et al. | |
| 8,172,320 B2 | 5/2012 | Kalinowski | |
| 9,132,754 B2 | 9/2015 | Mindel et al. | |

(Continued)

FOREIGN PATENT DOCUMENTS

| | | |
|---|---|---|
| JP | 2005287765 | 10/2005 |
| JP | 2007106378 | 4/2007 |

(Continued)

*Primary Examiner* — Anthony D Barfield
(74) *Attorney, Agent, or Firm* — Mark E. Duell; Rankin, Hill & Clark LLP

(57) ABSTRACT

A vehicle assembly includes a vehicle body including an interior panel, a seat having a frame fixed to the panel, and a seat energy absorber operably associated with the seat and including a backing and a bracket. The backing is formed from the vehicle body and positioned separated from the seat to define a space between the seat and the backing along a length of the panel, and the bracket is mounted in the space on at least one of the seat and the backing such that a proximal end portion of the bracket is located closer to the seat than the backing, and a distal end portion of the bracket is located closer to the backing than the seat. During a crash event a section of the panel is configured to collapse against the seat when the seat is driven toward the panel relative to the vehicle body.

20 Claims, 3 Drawing Sheets

(56) References Cited

U.S. PATENT DOCUMENTS

| | | | |
|---|---|---|---|
| 9,616,778 B1* | 4/2017 | Bates | B60N 3/3013 |
| 2016/0176321 A1* | 6/2016 | Patalak | B60N 2/015 |
| | | | 29/434 |

FOREIGN PATENT DOCUMENTS

| | | |
|---|---|---|
| JP | 2014205468 | 10/2014 |
| KR | 101584006 | 1/2016 |

* cited by examiner

SEAT ENERGY ABSORBER ASSEMBLY

BACKGROUND

Known vehicles include structural features designed to collapse and absorb kinetic energy in a collision to safeguard occupants. In order to absorb sufficient kinetic energy in a collision, such collapsing features occupy space within a vehicle body and reduce an interior space of the vehicle available for occupants. Accordingly, there is a desire for vehicle assemblies having features that are compact during nominal operation of the vehicle, and configured to collapse during a collision to absorb kinetic energy in a collision and safeguard vehicle occupants.

BRIEF DESCRIPTION

According to one aspect, a vehicle assembly comprises a vehicle body including an interior panel, a seat having a frame fixed to the panel, and a seat energy absorber operably associated with the seat and including a backing and a bracket. The backing is formed from the vehicle body and positioned separated from the seat to define a space between the seat and the backing along a length of the panel. The bracket is mounted in the space on at least one of the seat and the backing such that a proximal end portion of the bracket is located closer to the seat than the backing, and a distal end portion of the bracket is located closer to the backing than the seat. During a crash event a section of the panel is configured to collapse against the seat when the seat is driven toward the panel relative to the vehicle body, the backing is configured to support the seat in the vehicle body when the panel section collapses against the seat and closes the space between the seat and the backing, and the bracket is configured to collapse between the seat and the backing when the panel section collapses against the seat and closes the space between the seat and the backing.

According to another aspect, a vehicle assembly comprises a vehicle body, a seat, and a seat energy absorber. The vehicle body has an interior panel. The seat has a seat base and a seat back, a frame of the seat back secured to the panel. The seat energy absorber is positioned between the seat back frame and the vehicle body. The seat energy absorber includes a bracket having a first part and a second part separate from the first part and looped beneath the first part relative to a height direction of the vehicle assembly. During a crash event where the seat is driven toward the panel, the first part of the bracket is configured to deform in one of a first height direction and a second opposite height direction, and the second part of the bracket is configured to deform in the second height direction to absorb kinetic energy in the seat when the seat is driven toward the panel.

According to another aspect, a seat energy absorber for a vehicle assembly is provided. The vehicle assembly includes a seat and a vehicle body having a panel and a backing for the seat. The seat energy absorber comprises a bracket having a first part and a second part separate from the first part and looped beneath the first part relative to a height direction of the vehicle assembly such that the first part is interposed between and separates a proximal end portion of the second part and a distal end portion of the second part in a direction taken from the seat to the backing. The seat energy absorber is positioned between the seat and the backing. During a crash event where the seat is driven toward the panel, the first part of the bracket is configured to deform in one of a first height direction and a second opposite height direction such that a proximal end portion of the first part and a distal end portion of the first part fold toward each other and form a single fold in the first part, and the second part of the bracket is configured to deform in the second height direction such that the proximal end portion of the second part and the distal end portion of the second part fold toward each other and form a single fold in the second part.

DETAILED DESCRIPTION

Figure 1:
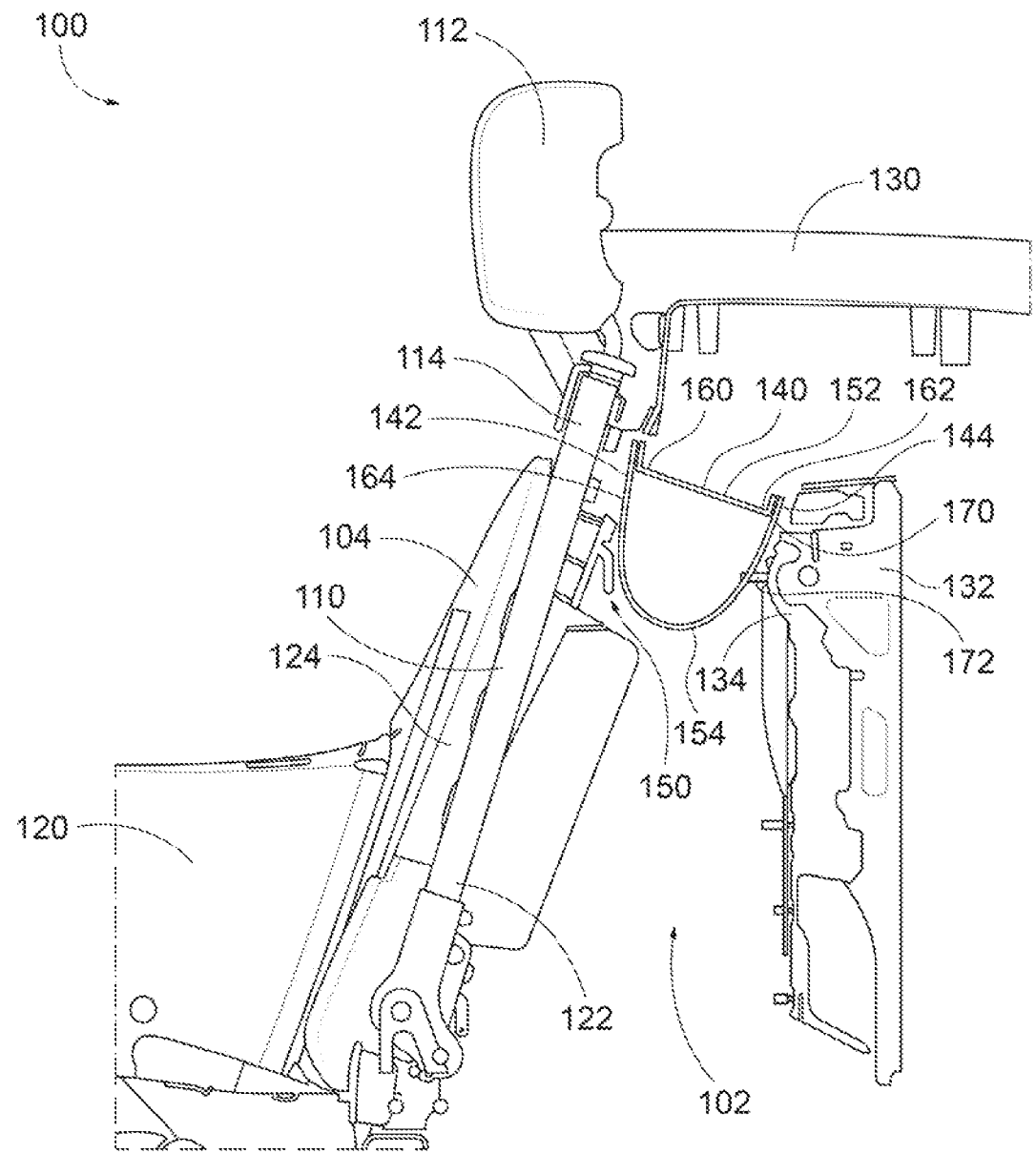
FIG. 1 is a partial cross-sectional side view of a vehicle assembly including a seat energy absorber according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a partial cross-sectional view of a vehicle 100 including a cross-sectional side view of a seat energy absorber 102 according to the present disclosure. The vehicle 100 includes a seat 104 having a frame 110, a headrest portion 112 fixed to a distal end portion 114 of the frame 110, a base 120 fixed to a proximal end portion 122 of the frame 110, and a seat back or seat body 124 disposed along the frame 110 between the distal end portion 114 and the proximal end portion 122. The seat 104 is configured to accommodate a user (not shown) in the vehicle 100, where the headrest portion 112 is configured for accommodating a head of the user accommodated in the seat 104, with the user seated on the base 120 and against the seat body 124.

The distal end portion 114 of the frame 110 is fixed to a panel 130 of a vehicle body 132, where the panel 130 is a trim panel, and a section of the panel 130 along a length of the panel 130 is configured to collapse against the seat 104 when the seat 104 is driven toward the panel 130 relative to the vehicle body 132 during a crash event. In the depicted embodiment, the panel 130 is located behind the seat 104 with respect to a front-back direction of the seat 104, with the section of the panel 130 configured to collapse against the seat 104 oriented along the front-back direction of the seat 104 so as to collapse against the seat 104 when the seat 104 is driven backwards relative to the vehicle body 132. With this construction, the panel 130 is an interior panel configured to collapse backwards against the seat 104 in the front-back direction of the seat 104 relative to the vehicle body 132 when the seat 104 is driven backwards in the front-back direction of the seat 104, toward the panel 130 relative to the vehicle body 132.

With continued reference to FIG. 1, the seat energy absorber 102 includes a backing 134 and a bracket 140. The backing 134 is formed from the vehicle body 132 and is positioned separated from the seat 104 to define a space between the seat 104 and the backing 134 in the front-back direction of the seat 104, along the length of the panel 130. The backing 134 is configured to support the seat 104 in the vehicle 100 when the section of the panel 130 collapses against the seat 104 and closes the space between the seat 104 and the backing 134. A distance traveled by the frame 110 from a position where the panel 130 has not yet collapsed against the seat 104 to a position where the panel 130 has collapsed and the frame 110 is supported by the backing 134 defines a stroke of the frame 110. The stroke of the frame 110 extends across the space, from the seat 104 to the backing 134 along the length of the panel 130. In this manner, the space is configured to accommodate the seat 104 as the frame 110 travels along the stroke due to a crash event.

The bracket 140 is mounted in the space on at least one of the seat 104 and the backing 134 such that a proximal end portion 142 of the bracket 140 is located closer to the seat 104 than the backing 134, and a distal end portion 144 of the bracket 140 is located closer to the backing 134 than the seat 104. In an embodiment where the bracket 140 is mounted on one of the seat 104 and the backing 134, the bracket 140 extends across the space to define a gap 150 between the bracket 140 and the other of the seat 104 and the backing 134. The is gap 150 is sized to prevent contact between the bracket 140 and the other of the backing 134 and the seat 104 during nominal operation of the vehicle 100, prior to the seat 104 being driven toward the panel 130 relative to the vehicle body 132 during a crash event. The bracket 140 extends across the space to maximize a length of the bracket 140 that extends along the stroke of the frame 110 such that the gap 150 has an otherwise minimal length between the bracket 140 and the other of the seat 104 and the backing 134.

In the illustrated embodiment, the bracket 140 is mounted on the backing 134, where the distal end portion 144 of the bracket 140 is fixed to a side of the backing 134 facing the seat 104 across the space, and the gap 150 is defined between the proximal end portion 142 of the bracket 140 and the seat 104. When the seat 104 is driven toward the panel 130 relative to the backing 134, the panel 130 collapses against the seat 104 along the stroke of the frame 110, and the seat 104 closes the gap 150 between the seat 104 and the bracket 140. In this manner, the seat 104 engages the backing 134 through the proximal end portion 142 of the bracket 140 at the frame 110 and the seat body 124.

Figure 2:
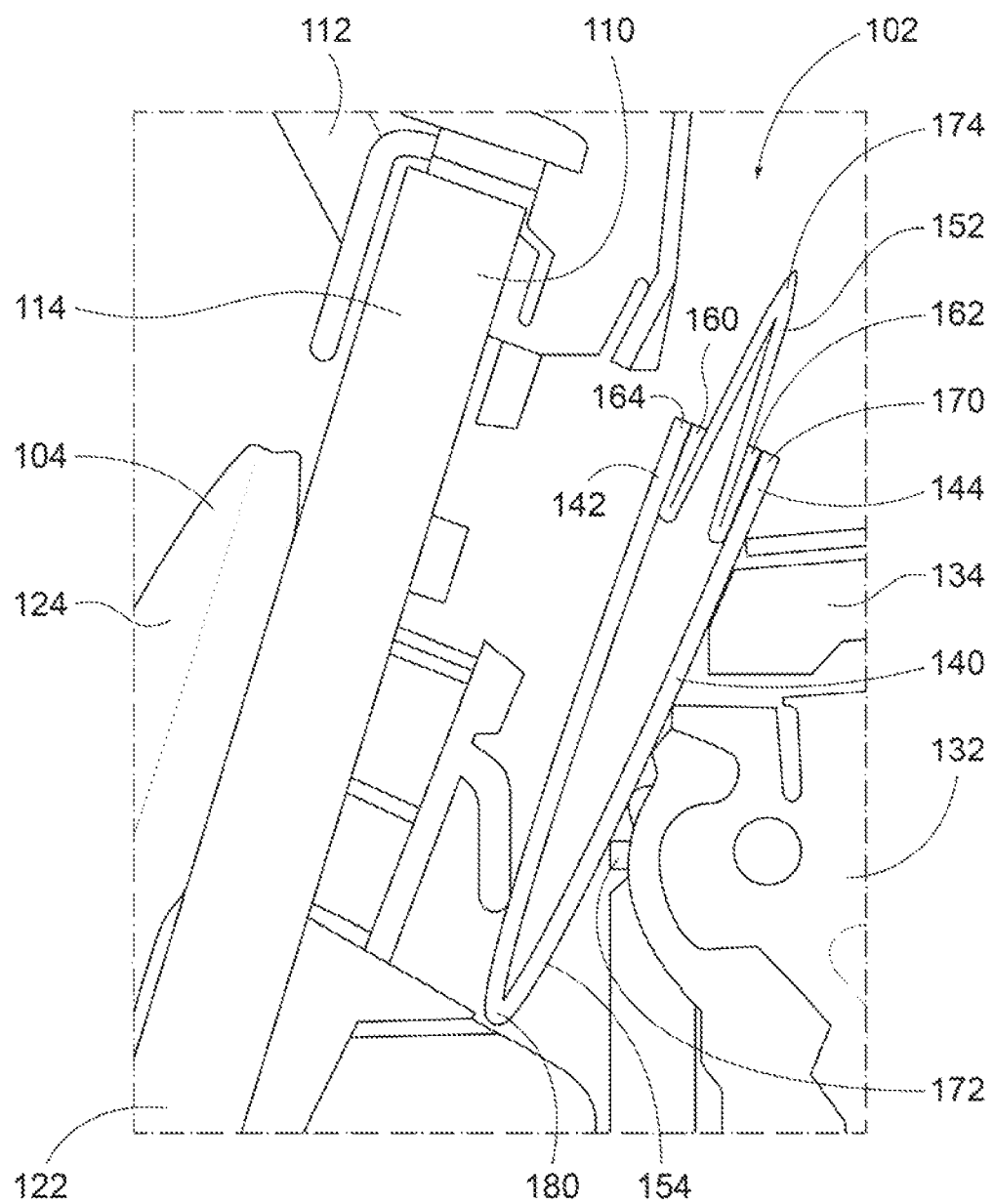
FIG. 2 is an enlarged partial cross-sectional side view of the seat energy absorber of FIG. 1 after a crash event, according to an embodiment.

As the seat 104 continues traveling along the stroke of the frame 110 toward the backing 134, the bracket 140 collapses against the seat 104 between the seat 104 and the backing 134 until, as shown in FIG. 2, the bracket 140 is crushed thin with respect to the direction of the stroke. In this condition, the bracket 140 has a substantially flat profile when viewed in a direction normal to the stroke of the frame 110.

Figure 3:
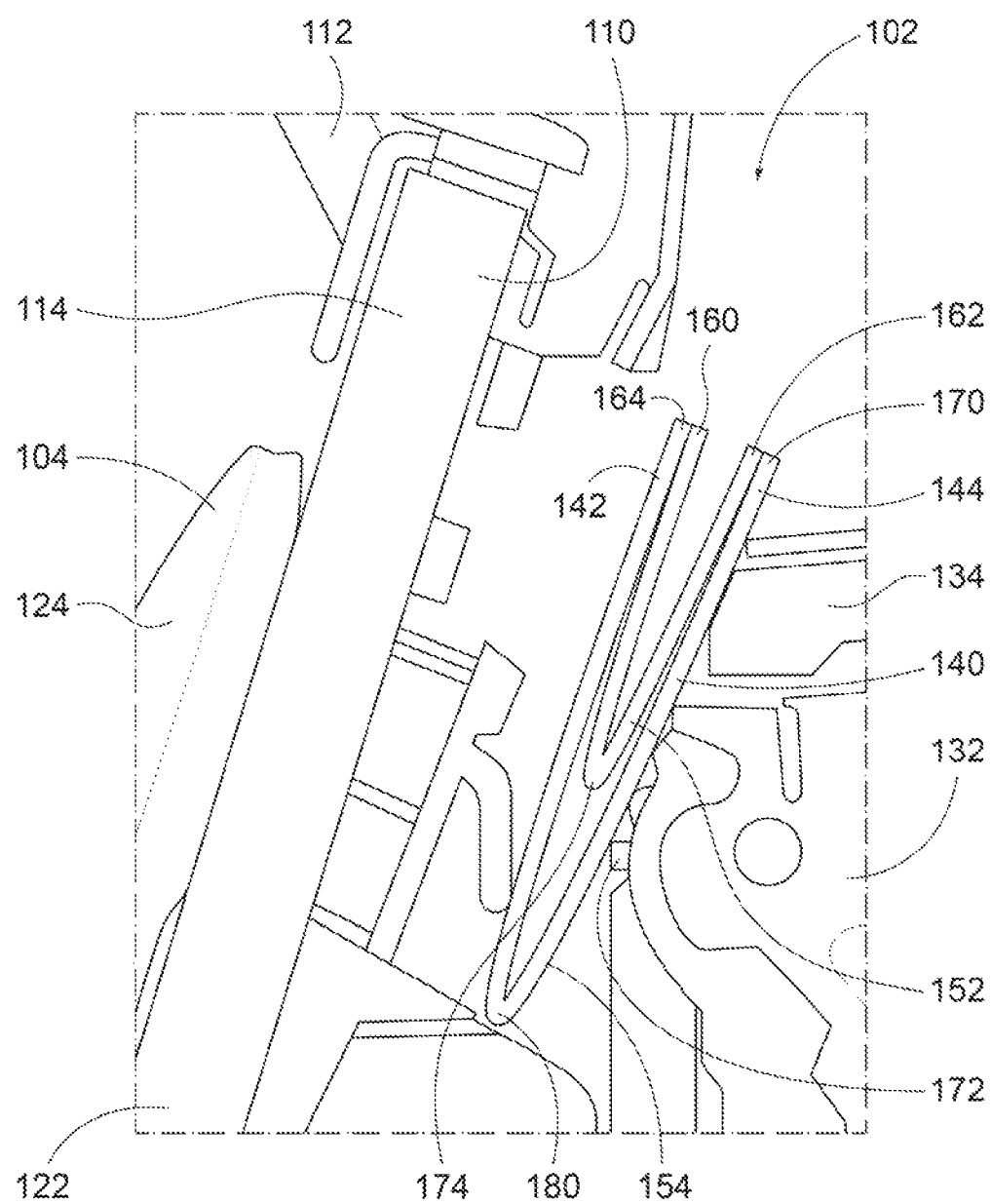
FIG. 3 is an enlarged partial cross-sectional side view of the seat energy absorber of FIG. 1 after a crash event, according to another embodiment.

The bracket 140 is configured to collapse and be substantially flat between the seat 104 and the backing 134 to maximize a length of the stroke of the frame 110. To this end the stroke of the frame 110 ends with the seat 104 in a position where the bracket 140 cannot be further crushed between the seat 104 and the backing 134, and the backing 134 does not collapse or otherwise deflect with the panel 130 such that the backing 134 supports the seat 104 in the vehicle 100. In this manner, the bracket 140 is configured to collapse between the seat 104 and the backing 134 when the panel 130 collapses against the seat 104 and closes the space between the seat 104 and the backing 134 so as to absorb kinetic energy from the seat 104 as the seat 104 is driven toward the panel 130 and travels along the stroke of the frame 110. As shown between FIGS. 1-3, the bracket 140 extends across the space between the seat 104 and the backing 134, along the length of the panel 130, and the bracket 140 is configured to collapse with a substantially flat profile to maximize a length of the stroke of the frame 110, and kinetic energy absorption from the seat 104 along the stroke of the frame 110. When the frame 110 has reached the end of the stroke as shown in FIGS. 2 and 3, the backing 134 is configured to support the frame 110 in the vehicle body 132 through the bracket 140.

With reference to FIG. 1, the distal end portion 114 of the frame 110 is located closer to the headrest portion 112 than the base 120, and the proximal end portion 122 of the frame 110 is located closer to the base 120 than the headrest portion 112. The panel 130 is fixed to the distal end portion 114 of the frame 110, and the backing 134 is configured to engage the distal end portion 114 of the frame 110 through the bracket 140 when the bracket 140 collapses between the seat 104 and the backing 134.

The bracket 140 includes a first wall section 152 and a second wall section 154 extended across the space and configured to collapse between the seat 104 and the backing 134. In the illustrated embodiment, the first wall section 152 extends across the space between the seat 104 and the backing 134 to have a proximal end portion 160 forming the proximal end portion 142 of the bracket 140, and to have a distal end portion 162 forming the distal end portion 144 of the bracket 140. Also, the second wall section 154 extends across the space between the seat 104 and the backing 134 to have a proximal end portion 164 forming the proximal end portion 142 of the bracket 140, and to have a distal end portion 170 forming the distal end portion 144 of the bracket 140.

The second wall section 154 extends around the first wall section 152 such that the first wall section 152 is interposed between and separates the proximal end portion 164 of the second wall section 154 and the distal end portion 170 of the second wall section 154 in the front-back direction of the seat 104, along the length of the panel 130. With this construction, the proximal end portion 164 of the second wall section 154 is interposed between and separates the seat 104 and the proximal end portion 160 of the first wall section 152 along the length of the panel 130, and the distal end portion 170 of the second wall section 154 is interposed between and separates the distal end portion 162 of the first wall section 152 and the backing 134 along the length of the panel 130.

The proximal end portion 160 of the first wall section 152 is fixed with the proximal end portion 164 of the second wall section 154 to form the proximal end portion 142 of the bracket 140, and the distal end portion 162 of the first wall section 152 is fixed with the distal end portion 170 of the second wall section 154 to form the distal end portion 144 of the bracket 140. In the depicted embodiment, the proximal end portion 160 of the first wall section 152 is fixed with the proximal end portion 164 of the second wall section 154 by crimping the proximal end portion 160 of the first wall section 152 with the proximal end portion 164 of the second wall section 154, and the distal end portion 162 of the first wall section 152 is fixed with the distal end portion 170 of the second wall section 154 by crimping the distal end portion 162 of the first wall section 152 with the distal end portion 170 of the second wall section 154. However, it should be appreciated that the first wall section 152 and the second wall section 154 may additionally and/or alternatively be fixed together with adhesive, welding, or fasteners such as bolts, screws, and staples without departing from the scope of the present disclosure. In the depicted embodiment, the distal end portion 170 of the second wall section 154 is fixed with bolts 172 to the side of the backing 134 facing the seat 104 across the space. However, additional and/or alternative fasteners and means for fixing the bracket 140 to the backing 134 such as fasteners, welds, and adhesive may be employed to fix the bracket 140 with the backing 134 without departing from the scope of the present disclosure.

With continued reference to FIG. 1, the first wall section 152 is a flat plate and has a straight profile when viewed normal to the length of the panel 130. The second wall section 154 is bent around the first wall section 152 with a U-shaped profile when viewed normal to the length of the panel 130. The second wall section 154 is bent around the first wall section 152 along the length of the panel 130 such that, as shown in FIG. 2, when the panel 130 collapses against the seat 104, the proximal end portion 164 of the second wall section 154 and the distal end portion 170 of the second wall section 154 fold toward each other, toward the first wall section 152, and overlap each other in the front-back direction of the seat 104. The first wall section 152 extends between the proximal end portion 164 of the second wall section 154 and the distal end portion 170 of the second wall section 154 such that when the proximal end portion 164 of the second wall section 154 and the distal end portion 170 of the second wall section 154 fold toward the first wall section 152, the proximal end portion 160 of the first wall section 152 and the distal end portion 162 of the first wall section 152 fold toward each other and overlap each other in the front-back direction of the seat 104. As such, when the bracket 140 collapses between the seat 104 and the backing 134, the proximal end portion 160 of the first wall section 152 and the distal end portion 162 of the first wall section 152 fold toward each other between the proximal end portion 164 of the second wall section 154 and the distal end portion 170 of the second wall section 154, and overlap each other in the front-back direction of the seat 104.

When the bracket 140 collapses between the seat 104 and the backing 134, a first fold 174 is formed in the first wall section 152, the first fold 174 being directed away from the second wall section 154. The proximal end portion 160 of the first wall section 152 and the distal end portion 162 of the first wall section 152 overlay each other at the first fold 174 along the first wall section 152 and form a laminate structure in the bracket 140 when the bracket 140 collapses between the seat 104 and the backing 134. In the depicted embodiment, the first fold 174 is a single fold located midway along the first wall section 152 between the proximal end portion 160 of the first wall section 152 and the distal end portion 162 of the first wall section 152 such that the first wall section 152 folds flat when the bracket 140 collapses between the seat 104 and the backing 134. However, the first wall section 152 may be configured to feature multiple folds between the proximal end portion 160 of the first wall section 152 and the distal end portion 162 of the first wall section 152 when the bracket 140 collapses between the seat 104 and the backing 134 without departing from the scope of the present disclosure.

When the bracket 140 collapses between the seat 104 and the backing 134 during a crash event, a second fold 180 is formed in the second wall section 154, the second fold 180 being directed away from the first wall section 152. The proximal end portion 164 of the second wall section 154 and the distal end portion 170 of the second wall section 154 overlay each other at the second fold 180 along the second wall section 154 and form a laminate structure in the bracket 140 when the bracket 140 collapses between the seat 104 and the backing 134. In the depicted embodiment, the second fold 180 is a single fold located midway along the second wall section 154 between the proximal end portion 164 of the second wall section 154 and the distal end portion 170 of the second wall section 154 such that the second wall section 154 folds flat when the bracket 140 collapses between the seat 104 and the backing 134. However, the second wall section 154 may be configured to feature multiple folds between the proximal end portion 164 of the second wall section 154 and the distal end portion 170 of the second wall section 154 when the bracket 140 collapses between the seat 104 and the backing 134 without departing from the scope of the present disclosure.

As is evident from the foregoing, a vehicle assembly in the vehicle 100 includes the vehicle body 132 having the panel 130, the seat 104 having the base (seat base) 120 and the seat body (seat back) 124, the frame 110 of the seat back 124 secured to the panel 130, and the seat energy absorber 102 positioned between the seat back 124 frame 110 and the vehicle body 132. The seat energy absorber 102 includes the bracket 140 having the first part or first wall section 152 and the second part or second wall section 154 separate from the first part 152 and looped beneath the first part 152 relative to a height direction of the vehicle assembly that is a height direction of the vehicle 100. During a crash event where the seat 104 is driven toward the panel 130, the first part 152 of the bracket 140 is configured to deform in one of a first height direction (see FIG. 2) and an opposite second height direction (see FIG. 3) and the second part 154 of the bracket 140 is configured to deform in the second height direction to absorb kinetic energy in the seat when the seat 104 is driven toward the panel 130.

FIG. 2 depicts an embodiment of the bracket 140 where the first part 152 is configured to deform in the first height direction such that the first part 152 folds upwardly in the first height direction, and the second part 154 is configured such that deformation of the second part 154 downwardly folds the second part 154 in the second height direction. When the first part 152 deforms in the first height direction and the second part 154 deforms in the second height direction as shown in FIG. 2, the second part 154 extends further in the second height direction than the first part 152 extends in the first height direction.

FIG. 3 depicts an embodiment of the bracket 140 where the first part 152 is configured to deform in the second height direction such that the first part 152 folds downwardly in the second height direction toward the second part 152, and the second part 154 is configured such that deformation of the second part 154 downwardly folds the second part 154 in the second height direction. In this manner, the first part 152 extends between the proximal end portion 164 of the second part 154 and the distal end portion 170 of the second part 154 to form the first fold 174 as a single fold in the first part 152 directed in a fold direction of the second part 154 when the bracket 140 collapses between the seat 104 and the backing 134, and the second part 154 is bent around the first part 152 to form the second fold 180 as a single fold in the second part 154 directed in a fold direction of the first part 152 when the bracket 140 collapses between the seat 104 and the backing 134. When the first part 152 deforms in the second height direction and the second part 154 deforms in the second height direction as shown in FIG. 3, the second part 154 extends further in the second height direction than the first part 152 extends in the second height direction.

As shown in FIG. 1, the second part 154 is looped underneath the first part 152 such that the first part 152 is interposed between and separates the proximal end portion 164 of the second part 154 and the distal end portion 170 of the second part 154 along the front-back direction of the seat 104. The first part 152 includes the proximal end portion 160 and the distal end portion 162, the proximal end portion 160 of the first part 152 is fixed with the proximal end portion 164 of the second part 154, and the distal end portion 162 portion of the first part 152 is fixed with the distal end portion 170 of the second part 154.

In an embodiment, the bracket 140 including the first part 152 and the second part 154 separate from the first part 152 and looped beneath the first part 152 relative to the height direction of the vehicle assembly such that the first part 152 is interposed between and separates the proximal end portion 164 of the second part 154 and the distal end portion 170 of the second part 154 in a direction taken from the seat 104 to the backing 134. In the embodiment, the seat energy absorber 102 is positioned between the seat 104 and the backing 134, and during a crash event where the seat 104 is driven toward the panel 130 as shown in FIGS. 2 and 3, the first part 152 of the bracket 140 is configured to deform in one of a first height direction and an opposite second height direction such that the proximal end portion 160 of the first part 152 and a distal end portion 162 of the first part 152 fold toward each other and form the first fold 174 as a single fold in the first part 152, and the second part 154 of the bracket 140 is configured to deform in the second height direction such that the proximal end portion 164 of the second part 154 and the distal end portion 170 of the second part 154 fold toward each other and form the second fold 180 as a single fold in the second part 154.

The seat energy absorber 102 is configured to absorb kinetic energy from the seat 104 as the seat 104 is driven toward the panel 130 and travels along the stroke of the frame 110. In the depicted embodiment, the seat energy absorber 102 is configured to absorb kinetic energy in the seat 104 when the vehicle 100 experiences a crash event that drives the seat 104 toward the backing 134, however, the panel 130 and the bracket 140 may be configured to otherwise collapse in the front-back direction of the seat 104 to absorb kinetic energy in the seat 104 when the seat 104 is driven backwards toward the panel 130 without departing from the scope of the present disclosure.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
a vehicle body including an interior panel;
a seat having a frame fixed to the panel; and
a seat energy absorber operably associated with the seat and including a backing and a bracket,
wherein the backing is formed from the vehicle body and positioned separated from the seat to define a space between the seat and the backing along a length of the panel,
wherein the bracket is mounted in the space on at least one of the seat and the backing such that a proximal end portion of the bracket is located closer to the seat than the backing, and a distal end portion of the bracket is located closer to the backing than the seat,
wherein during a crash event a section of the panel is configured to collapse against the seat when the seat is driven toward the panel relative to the vehicle body, the backing is configured to support the seat in the vehicle body when the panel section collapses against the seat and closes the space between the seat and the backing, and the bracket is configured to collapse between the seat and the backing when the panel section collapses against the seat and closes the space between the seat and the backing,
wherein the bracket includes a first wall section and a second wall section each extended across the space,
the first wall section includes a proximal end portion forming the proximal end portion of the bracket, and a distal end portion forming the distal end portion of the bracket; and
the second wall section is extended around the first wall section, the second wall section includes a proximal end portion forming the proximal end portion of the bracket, and a distal end portion forming the distal end portion of the bracket.

2. The vehicle assembly according to claim 1,
wherein the proximal end portion of the second wall section is interposed between and separates the seat and the proximal end portion of the first wall section along the panel section; and
wherein the distal end portion of the second wall section is interposed between and separates the distal end portion of the first wall section and the backing along the panel section.

3. The vehicle assembly according to claim 2, wherein the second wall section is bent around the first wall section along the panel section such that when the panel section collapses against the seat, the proximal end portion of the second wall section and the distal end portion of the second wall section fold toward each other, and toward the first wall section.

4. The vehicle assembly according to claim 3, wherein the first wall section extends between the proximal end portion of the second wall section and the distal end portion of the second wall section such that when the proximal end portion of the second wall section and the distal end portion of the second wall section fold toward the first wall section, the proximal end portion of the first wall section and the distal end portion of the first wall section fold toward each other.

5. The vehicle assembly according to claim 2, wherein the second wall section is bent around the first wall section to have a U-shaped profile when viewed normal to the length of the panel.

6. The vehicle assembly according to claim 2, wherein the second wall section is bent around the first wall section to form a single fold in the second wall section directed in a fold direction of the first wall section when the bracket collapses between the seat and the backing.

7. The vehicle assembly according to claim 2, wherein the first wall section extends between the proximal end portion of the second wall section and the distal end portion of the second wall section such that when the bracket collapses between the seat and the backing, the proximal end portion of the first wall section and the distal end portion of the first wall section fold toward each other.

8. The vehicle assembly according to claim 2, wherein the first wall section extends between the proximal end portion of the second wall section and the distal end portion of the second wall section to form a single fold in the first wall section directed in a fold direction of the second wall section when the bracket collapses between the seat and the backing.

9. The vehicle assembly according to claim 2, wherein the first wall section has a straight profile when viewed normal to the panel, and wherein the proximal end portion of the first wall section and the distal end portion of the first wall section overlap each other when the bracket collapses between the seat and the backing.

10. The vehicle assembly according to claim 2, wherein the proximal end portion of the first wall section and the distal end portion of the first wall section overlay each other and form a laminate structure in the bracket when the bracket collapses between the seat and the backing, and
wherein the proximal end portion of the second wall section and the distal end portion of the second wall section overlay each other and form a laminate structure in the bracket when the bracket collapses between the seat and the backing.

11. The vehicle assembly according to claim 1, wherein the bracket extends from one of the backing and the seat, across the space between the backing and the seat to the other of the backing and the seat, and defines a gap configured to prevent contact between the bracket and the other of the backing and the seat during nominal operation of the vehicle, prior to the seat being driven toward the panel relative to the vehicle body during the crash event.

12. The vehicle assembly according to claim 1, wherein the panel is located behind the seat with respect to a front-back direction of the seat, the length of the panel configured to collapse against the seat is oriented along the front-back direction of the seat, and the panel is configured to collapse backwards against the seat in the front-back direction relative to the vehicle body when the seat is driven backwards toward the panel relative to the vehicle body.

13. The vehicle assembly according to claim 1, wherein the backing is configured to engage the frame through the bracket when the bracket collapses between the seat and the backing to support the seat in the vehicle.

14. The vehicle assembly according to claim 1, wherein the panel is a trim panel fixed to a distal end portion of the frame located closer to a head of the seat than a base of the seat, and the backing is configured to engage the distal end portion of the frame through the bracket when the bracket collapses between the seat and the backing.

15. A vehicle assembly comprising:
a vehicle body including an interior panel;
a seat having a seat base and a seat back, a frame of the seat back secured to the panel; and
a seat energy absorber positioned in a space between the seat back frame and the vehicle body, the seat energy absorber includes a bracket having a first part and a second part separate from the first part and looped beneath the first part relative to a height direction of the vehicle assembly,
wherein the bracket extends in a front-back direction of the vehicle assembly from one of the vehicle body and the seat, across the space to the other of the vehicle body and the seat, and defines a gap configured to prevent contact between the bracket and the other of the vehicle body and the seat during operation of the vehicle,
wherein during a crash event where the seat is driven toward the panel closing the gap, the first part of the bracket is configured to deform in one of a first height direction and a second opposite height direction, and the second part of the bracket is configured to deform in the second height direction to absorb kinetic energy in the seat when the seat is driven toward the panel.

16. The vehicle assembly of claim 15, wherein during a crash event where the seat is driven toward the panel, the first part is configured to deform in the first height direction such that the first part folds upwardly in the first height direction, and the second part is configured such that deformation of the second part downwardly folds the second part in the second height direction.

17. The vehicle assembly of claim 15, wherein during a crash event where the seat is driven toward the panel, the first part is configured to deform in the first height direction, and
wherein when the first part deforms in the first height direction and the second part deforms in the second height direction, the second part extends further in the second height direction than the first part extends in the first height direction.

18. The vehicle assembly of claim 15, wherein during a crash event where the seat is driven toward the panel, the first part is configured to deform in the second height direction such that the first part folds downwardly in the second height direction, and the second part is configured such that deformation of the second part downwardly folds the second part in the second height direction.

19. The vehicle assembly of claim 15, wherein during a crash event where the seat is driven toward the panel, the first part is configured to deform in the second height direction, and
wherein when the first part deforms in the second height direction and the second part deforms in the second height direction, the second parts extends further in the second height direction than the first part.

20. A seat energy absorber for a vehicle assembly including a seat and a vehicle body having a panel and a backing for the seat, the seat energy absorber comprising:
a bracket having a first part and a second part separate from and fixedly attached to the first part, the second part looped beneath the first part relative to a height direction of the vehicle assembly such that the first part is interposed between and separates a proximal end portion of the second part and a distal end portion of the second part in a direction taken from the seat to the backing,
wherein the seat energy absorber is positioned between the seat and the backing, and during a crash event where the seat is driven toward the panel, the first part of the bracket is configured to deform in one of a first height direction and a second opposite height direction such that a proximal end portion of the first part and a distal end portion of the first part fold toward each other and form a single fold in the first part, and the second part of the bracket is configured to deform in the second height direction such that the proximal end portion of the second part and the distal end portion of the second part fold toward each other and form a single fold in the second part.

* * * * *